Figure 1:
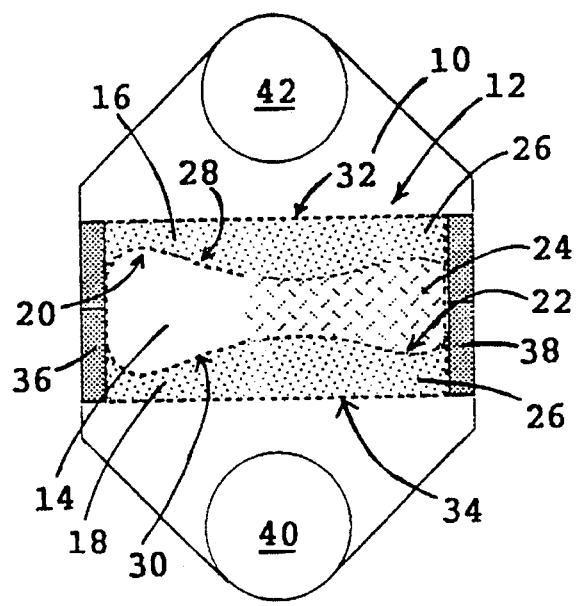

United States Patent [19]

Vesa

[11] Patent Number: 5,587,121
[45] Date of Patent: Dec. 24, 1996

[54] METHOD AND APPARATUS FOR THE PRODUCTION OF A GAS-PERVIOUS PART IN A GAS-PERVIOUS MOULD AND A PRODUCT MADE BY THIS METHOD

[76] Inventor: Juha Vesa, Palokärjenkatu 14 D, Turku, Finland, FIN-20610

[21] Appl. No.: 491,857

[22] PCT Filed: Jan. 12, 1994

[86] PCT No.: PCT/FI94/00013

§ 371 Date: Jul. 13, 1995

§ 102(e) Date: Jul. 13, 1995

[87] PCT Pub. No.: WO94/15768

PCT Pub. Date: Jul. 21, 1994

[30] Foreign Application Priority Data

Jan. 13, 1993 [FI] Finland ..................... 930125

[51] Int. Cl.⁶ .............. B29C 35/02; B68G 11/03
[52] U.S. Cl. .............. 264/126; 264/517; 264/122; 425/80.1
[58] Field of Search ............. 264/517, 122, 264/126; 425/80.1

[56] References Cited

U.S. PATENT DOCUMENTS

| | | |
|---|---|---|
| 4,692,199 | 9/1987 | Kozlowski et al. ............. 156/245 |
| 4,869,855 | 9/1989 | Twilley et al. ............. 264/25 |
| 5,366,678 | 11/1994 | Nomizo et al. ............. 264/122 |
| 5,378,296 | 1/1995 | Vesa ............. 156/62.6 |

FOREIGN PATENT DOCUMENTS

| | | |
|---|---|---|
| 0121929 | 10/1984 | European Pat. Off. . |
| 1-176513 | 7/1989 | Japan . |
| WO91/18828 | 12/1991 | WIPO . |

*Primary Examiner*—Mary Lynn Theisen
*Attorney, Agent, or Firm*—Nixon & Vanderhye P.C.

[57] ABSTRACT

A method and an apparatus for the moulding of a part from a gas-pervious raw material compound in a gas-pervious mould (14). The mould is positioned in flow chamber (10) in such a way that the gas flowing through the flow chamber is also caused to flow through the mould. A gas-pervious filling material chamber (16, 18) filled with filling material (26) is positioned in front of and/or behind the mould, which filling chamber brings about a desired, for instance an equally large, pressure drop over the "package" (12) formed by the mould and the filling material chamber along the whole cross-sectional area of the flow chamber. The invention also relates to the product produced by the method.

12 Claims, 2 Drawing Sheets

5,587,121

METHOD AND APPARATUS FOR THE PRODUCTION OF A GAS-PERVIOUS PART IN A GAS-PERVIOUS MOULD AND A PRODUCT MADE BY THIS METHOD

The present invention relates to a method and an apparatus for the moulding of a part from a gas-pervious raw material compound in a gas-pervious mould, which at least at one stage of the production is positioned in the gas flow of a flow chamber in such a way that the gas flows through the mould and the raw material. The present invention also relates to a product made by this method.

International Application WO 91/18828 discloses an apparatus for the production of formed parts, such as seat pads, in gas-pervious moulds. The production of the seat pads is carried out by positioning the mould in a flow chamber and filling it with padding material by means of a vacuum pressure, which mould in addition to the padding material contains binding fibres melting under the influence of heat. After the mould has been filled, hot air is passed through the filling chamber, which then also flows through the mould and the layer of padding material contained in it. When the temperature of the padding material has risen to a sufficiently high level, the binding fibres of the padding material melt and form bonds therein. After the heating step, the mould and the moulded part contained in it are caused to cool by leading air through the mould so as to solidify the binding material. The mould can be pressed together after the heating step.

It is sometimes difficult, in the heating step, to heat evenly throughout the part to be moulded, if it is not rectangular, i.e. if the layer of padding material is not of uniform thickness in the direction of the gas flow, but there are both thin and thick portions. When heat energy is led to the mould and the part to be heated contained therein, the hot air used for this purpose passes mainly through those points in which the pressure drop through the mould is smallest, i.e. through those points in which the layer of padding material is the thinnest. The portions of the part to be moulded, through which the main part of the hot gas flows, will then easily overheat, other portions possibly remaining below the moulding temperature.

It is an object of the present invention to provide a method and an apparatus which enable uniform heating and cooling of a part to be moulded in a mould.

It is another object of the invention to provide a method and an apparatus which better than before enable the production of parts of a variety of forms comprising both thin and thick layers of material.

It is a further object of the invention to provide a product produced by the new method, which comprises both thin and thick material layers.

In order to achieve the above mentioned objects, the method according to the present invention for the moulding of a part in a gas-pervious mould positioned in a flow chamber is characterized in that a gas-pervious layer of filling material is disposed in the flow chamber immediately in front of and/or behind the gas-pervious mould.

The apparatus according to the invention for the moulding of a part in a gas-pervious mould is correspondingly characterized in that a gas-pervious filling material chamber filled with filling material is positioned in front of and/or behind the mould, in relation to the flow in the flow chamber.

The product according to the invention is characterized in that the pressure drop caused by the raw material compound which is used to produce it and/or the moulded part in the gas flow depends mainly on the thickness of the layer of raw material compound, i.e. the shape of the part to be moulded, and that the variation of the pressure drop attributable to the shape of the moulded part is compensated during the production by positioning a layer of gas-pervious filling material in front of and/or behind the mould.

The arrangement according to the invention thus makes it possible to adjust the pressure drop in the gas flow over the mould filled with raw material compound and the filling material chamber filled with filling material to a suitable value along the whole width of the "package" to be heated. This ensures when desirable, for instance during the heating stage, in which hot air is passed through the flow chamber, a constant pressure drop over the whole cross section of the flow chamber, a uniform gas flow through the mould and a uniform heating of the mould and the raw material compound. An uniform temperature in the mould and the raw material compound enables uniform moulding.

The filling material should preferably have the same gas resistance as the raw material compound in the mould, i.e. the part to be moulded. For instance, when producing parts from a mixture of polyester fibres in which the fibre mixture consists of a matrix fibre and a binding material, i.e. a glueing or binding fibre melting at a lower temperature than the matrix fibre, the same polyester fibre, i.e. the matrix fibre which is used for producing the parts to be moulded, can advantageously be used as filling material. The binding material can then be entirely omitted. The filling material is not subjected to compression during the production and consequently the properties of it do not substantially change in the heating process.

The arrangement according to the invention can also be used to lead heat energy to a desired portion of the mould by varying the gas resistance of the filling material, for instance by filling the outside part of the mould to different densities. Thus various parts of the filling material chamber can be filled with filling materials having different gas resistances or layers of filling material of different thicknesses can be formed on the outside of various parts of the mould.

Figure 3:
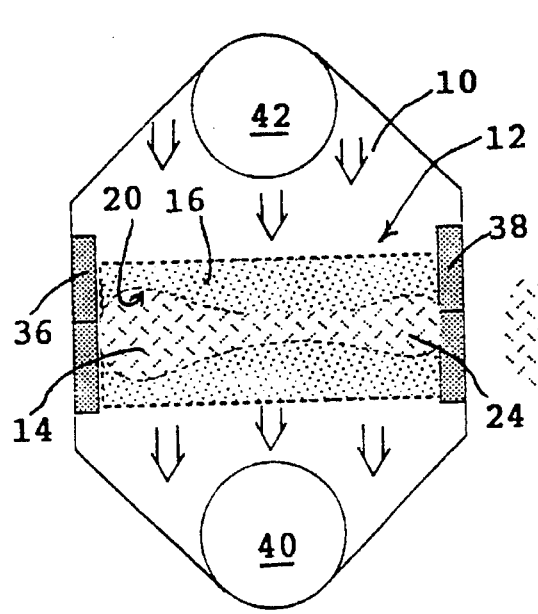
Figure 4:
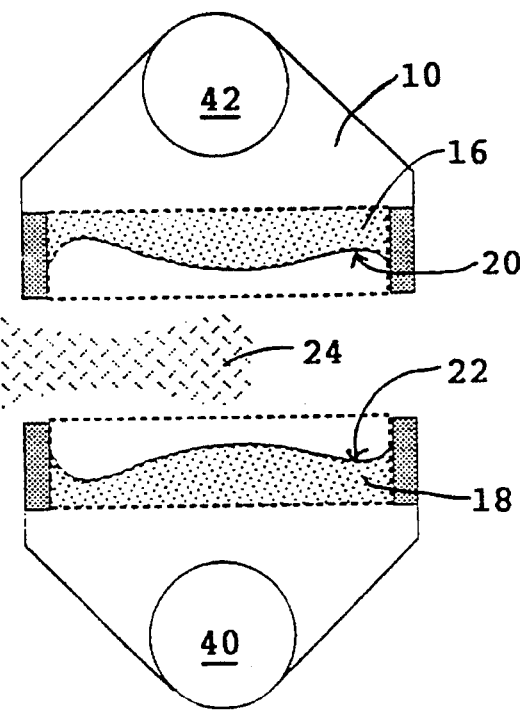
Figure 5:
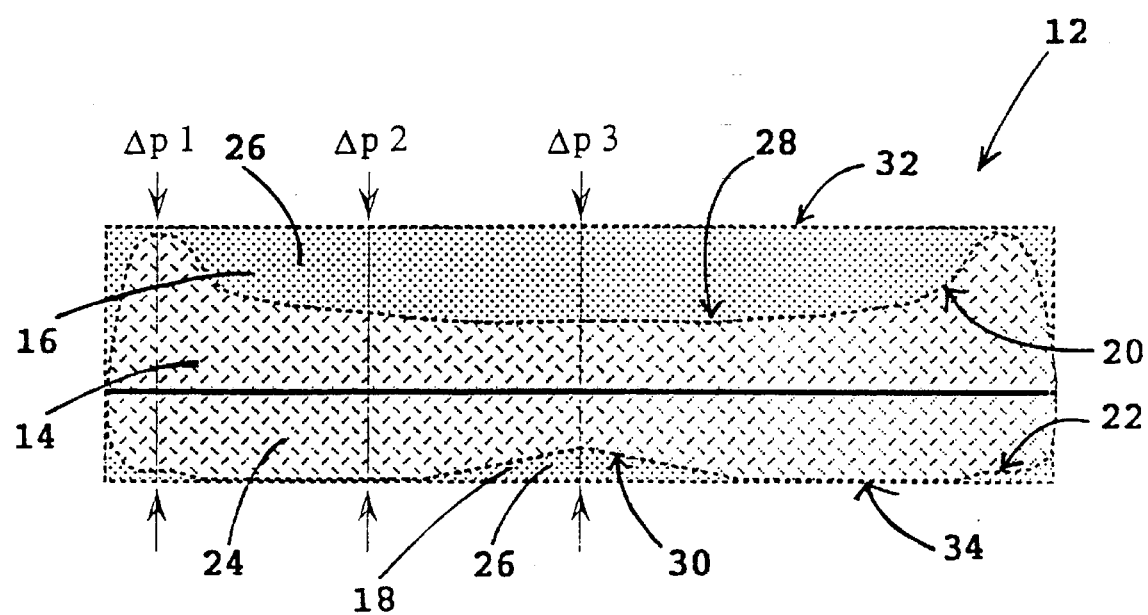

In the following, the invention will be described in greater detail with reference to the accompanying drawings, in which FIGS. 1–4 are schematic cross sectional views of the apparatus according to the invention at different stages of the production, and FIG. 5 is a schematic enlarged view of the mould and filling material chamber "package" according to the invention.

FIG. 1 shows a flow chamber 10 in which a "package" 12 consisting of a mould 14 and filling material chambers 16 and 18 are disposed. FIG. 1 shows a two-piece mould 14 in the first step, i.e. filling step, which mould is formed of an upper part 20 made of a gas-pervious material, e.g. a porous material, and a corresponding lower part 22. An inlet (not shown) for the supply of the raw material compound is connected to the mould. At the production stage shown in FIG. 1, the raw material from which the part 24 to be moulded is formed is fed into the mould by arranging a vacuum pressure on the outside of the mould. The mould is not full at the stage shown in FIG. 1.

The upper part 20 of the mould is covered by the filling material chamber 16 and the lower filling chamber 18 is disposed by the lower part 22 of the mould. The filling material chambers cover substantially the whole cross section of the flow chamber 10. The filling material chambers can be made of, for instance, netlike material or other gas-pervious material, which is able to hold the filling material 26 in the filling material chambers.

In the embodiment shown in FIG. 1, the filling material chambers are shaped in such a way that sides 28, 30 facing the mould correspond to the shape of the upper and lower parts of the mould and sides 32, 34 turned away from the mould are flat and at right angles to the gas flowing through the flow chamber.

The "package" formed by the mould 14 and the filling material chambers 16 and 18 is supported by side walls 36 and 38, which enables moving the "package" from one flow chamber to another, if necessary.

The flow chamber 10 is additionally provided with gas connection openings 40 and 42, through which gas can be introduced into or discharged from the flow chamber.

Figure 2:
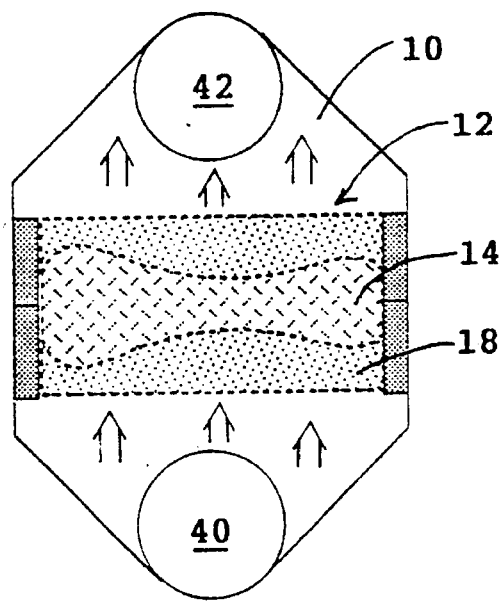

FIG. 2 shows the apparatus according to the invention in the following step, i.e. the heating step, in which hot gas, e.g. hot air, is led from the gas opening 40 to the flow chamber and further through the "package". The gas is sucked away through the opening 42.

The hot gas flows evenly through the "package" 12 and the mould positioned therein heating the raw material compound contained in the mould to a uniform temperature. A relatively thick layer of filling material in the central portion of the filling material chamber prevents the gas from flowing faster through the central portion of the mould than through the sides of the mould, although the flow resistance due to the thicker raw material layer is higher at the sides of the mould than in the central portion of the mould.

FIG. 3 shows the third production step, i.e. the compression and cooling step, in which cold air is passed from gas opening 42 to the flow chamber and through the "package" 12 so as to solidify the molten binding material and bind the raw material into the shape of the mould. The gas is removed through gas opening 40.

At the same time, the upper part 20 of the mould is pressed against the lower part 22 of the mould so as to compress the part 24 formed from the raw material in the mould. The upper part is slidingly mounted in the side walls 36 and 38 in such a way that it and the upper filling material chamber 16 can be pressed by mechanical means (not showed) towards the lower part 22 of the mould.

FIG. 4 shows the last step, i.e. that of the mould emptying. The upper part of the flow chamber and the upper parts of the mould and the filling material chamber connected to it can be raised so that the moulded part 24 can be removed from the mould.

FIG. 5 shows in enlarged scale the "package" 12 formed by the mould 14 and the filling material chambers 16 and 18. The side portions of the mould are considerably higher than the central portion of the mould and thus the pressure drop through the central portion of the mould is obviously considerably smaller than through the sides of the mould. However, the filling material layers 26a and 26b disposed on the upper and lower sides of the mould equalize the pressure drops $\Delta p1$, $\Delta p2$ and $\Delta p3$ produced over the mould and the filling material layers making them essentially the same.

As can be seen from FIG. 5, the thickness of the filling material layers on the upper side and the lower side of the mould do not necessarily have to be of the same thickness but can be entirely different. If desired, the filling material layer can be provided on one side of the mould only.

The filling material layer consists preferably of a material similar to the raw material contained in the mould, and it is disposed in the filling material chamber formed, for instance, of netlike material. On the other hand, it is conceivable that the filling material layer be formed from some solid porous material having a suitable flow resistance. A separate net is then not needed for holding the filling material together. It is even conceivable that the upper and lower parts of the actual mould be made of a porous material replacing the filling material and that the walls of the mould be shaped in a suitable manner so that the pressure drop in the gas flow caused by the "package", taking into consideration the pressure drop caused by the part to be moulded, be constant over the whole cross section or vary in a desired manner.

In the embodiments shown in FIGS. 1–4, the filling of the mould as well as the heating and cooling take place in the same flow chamber. It is quite conceivable that these steps be arranged to take place in different flow channel using a movable mould and filling material chamber "package". The various flow chambers can be essentially similar, but connected to different gas and vacuum pressure systems.

When using several flow chambers, the "package" is first brought to a filling chamber, in which the mould is filled by means of vacuum pressure. The vacuum pressure is produced by suction effected on the outside of the mould. After the filling, the "package" is transferred to a heating chamber, which is connected to a hot gas or air supply or suction pipe. When the temperature of the mould and the raw material has reached a suitable value, the "package" is transferred from the heating chamber to a compression and cooling chamber provided with means for effecting compression and connected to a cold gas or air supply pipe.

The invention is not intended to be limited to the embodiments shown and described above, but can be modified within the scope of the invention defined in the appended claims.

I claim:

1. A method for moulding a part from a gas-pervious raw material compound in a gas-pervious mould which at least at one stage of the production is positioned in the gas flow of a flow chamber in such a way that the gas flows through the mould and the raw material, comprising the steps of:

positioning a gas-pervious layer of filling material immediately in front of and/or behind the gas-pervious mould in the gas flow; and forming said layer of gas-pervious filling material so that the pressure drop across the mould, the raw material compound and the filling material layer is substantially constant over the whole cross-section of the gas flow through the mould, raw material compound and the filling material layer.

2. The method according to claim 1 including providing a gas resistance of the filling material substantially the same as the gas resistance of the raw material compound at least at one stage of the production of the part.

3. The method according to claim 1 including heating the part and providing a gas resistance of the filling material substantially the same as the gas resistance of the raw material compound while heating the part.

4. The method according to claim 1, characterized in that the production of the part comprises the following steps:

a filling step including filling the mould with the raw material compound;

a heating step including passing a hot gas through the mould, through the raw material compound contained therein and the filling material layer on the outside of the mould; and a cooling step including passing a cooling gas through the mould, through the raw material compound contained therein and the filling material layer on the outside of the mould.

5. The method according to claim 4 including performing the filling, heating and cooling steps when the mould is in the same flow channel.

6. The method according to claim 4 including performing the filling, heating and cooling steps when the mould is in different flow channels, respectively.

7. The method according to claim 4 including compressing the part to be moulded in the mould between the heating step and the cooling step and/or in the cooling step.

8. Apparatus for moulding a part from a gas-pervious raw material compound comprising:

a gas-pervious mould positioned in a flow chamber such that a gas flowing through the flow chamber flows through the mould;

a gas-pervious filling material chamber filled with filling material positioned in front of or behind the mould in relation to the gas flow in the flow chamber;

said gas-pervious filling material being disposed in the gas-pervious filling material chamber so that the pressure drop across the mould, the raw material compound and the filling material layer is substantially constant over the whole cross-section of the gas flow through the mould, raw material compound and the filling material layer.

9. The apparatus according to claim 8 wherein the first-mentioned filling material chamber is positioned in front of the mould, a second filling material chamber is positioned behind the mould, the cross-sectional area of which is substantially the same as the cross-sectional area of the mould disposed in the flow chamber and/or of the flow chamber and the side facing the mould of which is shaped to follow the shape of the mould and running in close contact with it.

10. The apparatus according to claim 8 wherein sides of the filling material chamber away from the mould are flat and lie substantially at right angles to the flow direction of the gas flowing through the flow chamber.

11. The apparatus according to claim 8 including a second flow chamber, said mould and said filling material chamber being movable from the first-mentioned flow chamber to said second flow chamber for different moulding steps.

12. A method of forming a gas-pervious moulded part moulded from a gas-pervious raw material compound in a gas-pervious mould which at least at one stage of production of said part the gas-pervious raw material compound is positioned in the gas flow of a flow chamber in such a way that the gas flows through the mould and the raw material, and wherein the pressure drop in the gas flow caused by the raw material compound and/or the moulded part is dependent on the thickness of the layer of the raw material compound, comprising the step of:

compensating for the variation of pressure drop attributable to the thickness of the moulded part during moulding including positioning a gas-pervious layer of filling material in front of and/or behind the mould.

* * * * *